Figure 1:
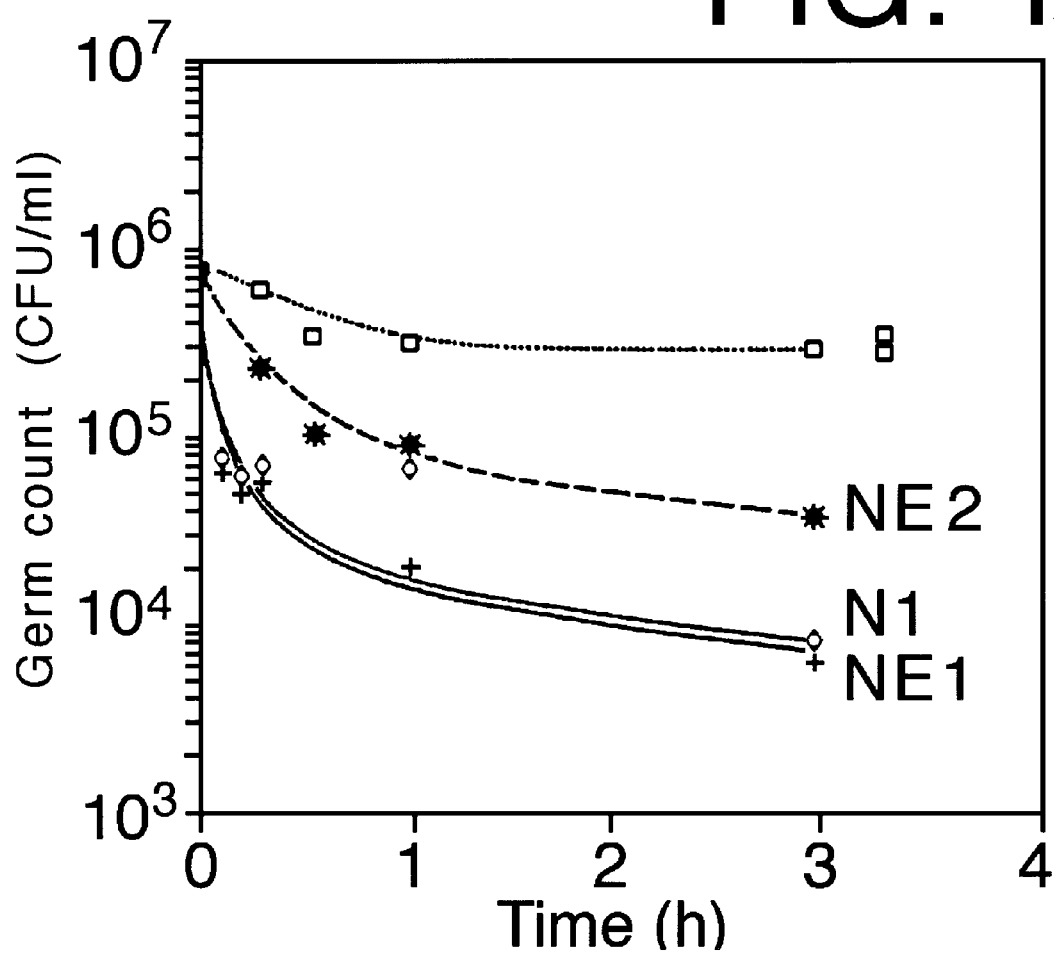

United States Patent

Huss et al.

[11] Patent Number: 5,965,033
[45] Date of Patent: Oct. 12, 1999

[54] PROCESS FOR DISINFECTING AQUEOUS SOLUTIONS

[75] Inventors: Michael Huss, Eschborn; Roland Schneider, Hasselroth; Birgit Del Grosso, Freigericht, all of Germany

[73] Assignee: Degussa-Hüls-Aktiengesellschaft, Frankfurt am Main, Germany

[21] Appl. No.: 09/011,958
[22] PCT Filed: Aug. 7, 1996
[86] PCT No.: PCT/EP96/03485
§ 371 Date: May 29, 1998
§ 102(e) Date: May 29, 1998
[87] PCT Pub. No.: WO97/08100
PCT Pub. Date: Mar. 6, 1997

[30] Foreign Application Priority Data

Aug. 25, 1995 [DE] Germany .................. 195 31 241

[51] Int. Cl.$^6$ .................................................. C02F 1/72
[52] U.S. Cl. ...................... 210/759; 210/764; 210/916; 422/5; 422/28
[58] Field of Search .................... 210/759, 764, 210/916; 422/5, 28

[56] References Cited

U.S. PATENT DOCUMENTS

| | | | |
|---|---|---|---|
| 5,393,781 | 2/1995 | Vegega et al. | 514/557 |
| 5,409,713 | 4/1995 | Lokkesmoe et al. | 424/616 |
| 5,565,231 | 10/1996 | Malone et al. | 426/532 |
| 5,733,474 | 3/1998 | Kagermeier et al. | 252/186.25 |

FOREIGN PATENT DOCUMENTS

| | | |
|---|---|---|
| 88/08667 | 5/1987 | WIPO . |
| 91/13058 | 9/1991 | WIPO . |
| 93/02973 | 2/1993 | WIPO . |
| 94/14321 | 7/1994 | WIPO . |
| 94/16110 | 7/1994 | WIPO . |

OTHER PUBLICATIONS

Peroxygens in Water Disinfection, Fraser et al., Jan. 22, 1992.
Bactericidal Properties of Peracetic Acid and Hydrogen Peroxide, Alone and in Combination, and Chlorine and Formaldehyde Against Bacterial Water Strains, Anouar Alasri et al., (1992), Can. J. Microbiol. Vol. 38, pp 635–642.

*Primary Examiner*—Jay H. Woo
*Assistant Examiner*—Betsey J. Morrison

[57] ABSTRACT

Owing to the concomitant storage, transport, material and handling problems and the unsatisfactory retarding of reinfection, the use of commercially available peracetic acid solutions with a high peracetic acid (PES) and acetic acid content for disinfecting large quantities of aqueous solutions, e.g. purification plant outlets, has been closely limited. It is possible to disinfect even large quantities of aqueous solutions economically and at the same time retard reinfection by using a peracetic acid solution containing 1.5 to 2.5 wt. % peracetic acid and 40 to 60 wt. % hydrogen peroxide and under 2 wt. % acetic acid as a disinfectant. The use of a peracetic acid solution with less than 1 wt. % acetic acid is preferred.

9 Claims, 2 Drawing Sheets

PROCESS FOR DISINFECTING AQUEOUS SOLUTIONS

DESCRIPTION

The invention relates to a process for the disinfection of aqueous solutions by using a disinfectant containing peracetic acid (PAA) and hydrogen peroxide ($H_2O_2$), the invention achieving not only effective germ reduction but also a retarded reappearance of germs.

Effective disinfection processes are necessary for the treatment of aqueous solutions, especially domestic sewage, surface waters and industrial circulating waters and effluents, containing microorganisms which cannot be discharged untreated for hygienic, operational or environmental reasons. Effective disinfection processes which are environmentally compatible at the same time are based on the use of active oxygen compounds, such as hydrogen peroxide in particular, and lower percarboxylic acids, especially peracetic acid, as disinfectants.

The report by J. A. L. Fraser et al. on the Desinfection (sic) of Water Conference of Jan. 22, 1992, London (SCI Water and Environment Group), gives a comparative survey of the biocidal properties, the handling and the use of hydrogen peroxide and peracetic acid in a variety of application areas:

Hydrogen peroxide is a moderately active, mild disinfectant with bacteriostatic properties. Although $H_2O_2$ concentrations of 25 mg/l inhibit the growth of some bacteria, an effective reduction of the germ count, even at a much higher $H_2O_2$ concentration, takes many hours or requires additional UV irradiation. In the case of the disinfection of large quantities of water, for instance for the treatment of water in sewage works and their outputs, such measures are inadequate and also uneconomic.

Peracetic acid is a highly effective disinfectant which is used to effect rapid germ reduction. Accordingly, peracetic acid is used for sterilization in the food industry and for the disinfection of bottles and hospitals. The use of peracetic acid for water treatment has hitherto been subordinate or non-existent. Due to the process for the manufacture of such solutions, they contain not only peracetic acid and water but also hydrogen peroxide and acetic acid, together with one or more stabilizers; the concentration of peracetic acid (PAA) and hydrogen peroxide ($H_2O_2$), and the molar ratio of PAA to $H_2O_2$, can vary within wide limits.

Commercially available peracetic acid solutions described in the cited conference report contain 15 wt. % of PAA, 14 wt. % of $H_2O_2$ and 28 wt. % of acetic acid, or 38 wt. % of PAA, 4 wt. % of $H_2O_2$ and 44.7 wt. % of acetic acid. Because of their caustic and fire-promoting properties, the use of such highly concentrated peracetic acid solutions creates handling, storage, material and transport problems. The disproportionately high acetic acid content is also responsible for increasing the chemical oxygen demand (COD) of the water to be treated. A much greater problem, however, is the fact that this extremely high proportion of freely available acetic acid—additional acetic acid is formed from the decomposition of the peracetic acid—forms the basis for a renewed and possibly explosive proliferation of the germs.

Peracetic acid solutions which are easier to handle, with a lower peracetic acid content, for instance 0.5 to 12.5 wt. % of peracetic acid, can be prepared by diluting more concentrated solutions with water and requisite amounts of acetic acid and/or hydrogen peroxide—cf. WO 91/12058. Such solutions are proposed in said document for domestic hygiene purposes. This document does not suggest the idea of also using peracetic acid solutions diluted in this way for the disinfection of large quantities of water, instead of the more highly concentrated solutions mentioned above. Also, there is no suggestion of using solutions with a very low peracetic acid content and at the same time a high $H_2O_2$ content for such a purpose.

WO 94/16110 teaches a process for the disinfection of aqueous sugar solutions or similar solutions. The peracetic acid solution used here contains 0.5 to 5 wt. %, preferably 2 to 3 wt. %, of peracetic acid (PAA) and 15 to 50 wt. % of hydrogen peroxide, the molar ratio of $H_2O_2$ to PAA being between 12:1 and 120:1, especially between 18:1 and 54:1. The amount used is preferably 5 to 50 mg of PAA per liter. The process described in WO 94/16110 additionally includes the use of a peracetic acid solution with a smaller molar ratio of $H_2O_2$ to PAA than that mentioned above. This document does not suggest using a dilute peracetic acid solution with the above-mentioned high molar ratio of $H_2O_2$ to PAA for disinfection purposes other than those within the framework of the process described in this document, especially for disinfection combined with a retardation of the reappearance of germs.

A stable, easily transportable peracetic acid solution for disinfection purposes is known from WO 88/08667. This solution contains 0.2 to 8 wt. % of $H_2O_2$, a total of 0.2 to 11 wt. % of peracetic acid and acetic acid, and stabilizers; the ratio of $H_2O_2$ to the sum of the acids is between 1 and 11. Such solutions exhibit an inadequate action in respect of the desired retardation of the reappearance of germs. On the contrary, a large amount of acetic acid even promotes the reappearance of germs. Furthermore, the solutions according to the Examples, with a high acetic acid content and at the same time a very low peracetic acid content, have the disadvantage of an intense odour; also, their use increases the COD.

WO 94/14321 discloses another transportable peracetic acid solution containing surfactant, with 1 to 6 wt. % of PAA and a weight ratio of $H_2O_2$ to PAA in the range 10:1 to 1:10, for disinfection purposes. The use concentration is at least 5 mg of PAA per litre of water. Here again the reappearance of germs is not retarded.

According to Cavadore et al. in L'EAU, L'INDUSTRIE, les NUISANCES 166, 100–102, peracetic acid solutions of unspecified composition were tested for the treatment of water from domestic sewage treatment plants. The germ count of coliform bacteria and streptococci could be greatly reduced by using amounts of 1 and 2 mg of PAA per liter. The solutions used are also said to have shown a bacteriostatic action some hours after the treatment. However, because the composition of the peracetic acid solutions used is not specified, the technical teaching is not comprehensible since, as explained previously, numerous completely different compositions for peracetic acid solutions are known in the state of the art. The fact that the authors of the document belong to the group of enterprises which also markets the peracetic acid solutions indicated in the above-cited conference report at least suggests that the commercially available, highly concentrated PAA solutions were used.

The object of the invention is therefore to provide an improved process for disinfection with a simultaneous retardation of the reappearance of germs. The peracetic acid solution used for this purpose should be safe to handle and capable of being stored and transported without problems.

The object is achieved by a process for the disinfection of sewage works outputs and industrial circulating waters and effluents, and retardation of the reappearance of germs therein, by the addition of a disinfectant, containing peracetic acid and hydrogen peroxide, in an amount of at least 1 mg of peracetic acid per litre of water, said process being characterized in that the disinfectant contains 1.5 to 2.5 wt. % of peracetic acid, 40 to 60 wt. % of hydrogen peroxide and less than 2 wt. % of acetic acid.

In a preferred embodiment of the process, the disinfectant to be used is aqueous and contains 1.5 to 2.5 wt. % of peracetic acid, 40 to 50 wt. % of hydrogen peroxide and less than 1 wt. % of acetic acid.

Although the amount of disinfectant used under optimal pH, temperature and medium conditions can be around 1 mg of peracetic acid (PAA), it is preferable to use an amount of 4 to 10 mg of PAA per litre of water. If a high germ count is present and/or the water to be treated has a high content of substances readily oxidizable by $H_2O_2$ and/or PAA, for instance hydrogen sulphide, other sulphides and nitrite, it may be necessary to use a significantly larger amount of PAA per liter of water.

Surprisingly, it has been found that the special concentration ratios of peracetic acid and hydrogen peroxide in the disinfectant to be used according to the invention result in an appreciably better long-term action than do commercially available peracetic acid solutions, even one with about 5 wt. % of PAA, about 27 wt. % of $H_2O_2$ and about 7 wt. % of acetic acid.

Disinfection is understood as meaning the control of microorganisms from the series comprising bacteria, viruses, fungi and algae. An attempt is always made here to maximize the destruction rate while minimizing the use concentration of the disinfectant and the use-orientated treatment time. At a conventional use concentration, disinfectants suitable for the industrial and domestic treatment of water conveniently have a destruction rate of over 99%, preferably over 99.9%. These destruction rates can easily be achieved with the disinfectant to be used according to the invention, for instance with a PAA use concentration in the range 4 to 10 mg/l. The person skilled in the art will carry out optimization experiments to determine the optimal use concentration, which can depend not only on the composition of the water but also on the pH and the temperature. Using disinfectants according to the invention also effects a retarded reappearance of germs in the water. The disinfectant therefore has a depot effect: After reduction of the germ count—the peracetic acid is primarily responsible for this—the hydrogen peroxide effects a retardation of growth, especially a bacteriostatic action. This markedly reduces the amount of peracetic acid disinfectant used and therefore improves the economic efficiency. Due to the extremely low content of acetic acid in the disinfectant to be used—the acetic acid content is generally significantly below 2 wt. % and, in the case of a solution with 1.5 to 2.5 wt. % of PAA, is frequently in the range 0.2 to 0.7 wt. %—the hitherto decisive basis for a rapid reappearance of germs no longer exists. On account of the special composition of the disinfectant to be used according to the invention, this combined action—germ destruction and growth inhibition—is achieved with a single agent. This is an important advantage in terms of application technology because only one storage container and one metering device for the disinfectant are required at the application site. At the optimal PAA use concentration in respect of germ destruction, the growth inhibition according to the invention is so effective that, in general, the germ count per ml of water is at least one order of magnitude below the initial value, even about 24 hours after the disinfectant was added.

Disinfectants to be used according to the invention can be obtained analogously to conventional peracetic acid solutions by the acid-catalyzed establishment of equilibrium in a mixture of acetic acid and hydrogen peroxide and, where necessary, dilution with water or aqueous hydrogen peroxide—cf., for example, WO 94/16110 cited in the introduction. During and/or after the establishment of equilibrium or dilution, it is possible to add an effective amount of active oxygen stabilizers, for instance from the series comprising phosphonic acid compounds, dipicolinic acid and salts thereof, polyphosphoric acids and salts thereof, and stannates, individually or in a synergistically effective combination. Because of the low PAA concentration of the peracetic acid solution, such solutions are easy to handle: It is merely necessary to take the conventional safety precautions for aqueous hydrogen peroxide solutions with a concentration of between 40 and 60 wt. % or, in the case of preferred solutions, 40 to 50 wt. %. Such solutions can also be stored in stainless steel and PAA plastic containers. Moreover, they are no longer regarded as hazardous to water and are therefore environmentally friendly.

The process according to the invention can be applied in various sectors. Examples which may be mentioned are recirculating water and effluent from the food, brewing and dairy industries; recirculating water and effluent from chemical processes, where problems are created by the presence or formation of germs in water without disinfection and inhibition of germ growth—for instance the formation of slime and odour; water and sludge from domestic sewage works; and swimming pool water. Another application of the process according to the invention is in the soil disinfection sector: Addition of the disinfectant to the water of an infiltration well reduces microorganisms in its immediate vicinity; this reduces the biological decomposition of the hydrogen peroxide present as oxygen carrier and increases the range of undecomposed hydrogen peroxide in the soil.

Substantial advantages of the process according to the invention are:
  good disinfecting action, easily controllable via the amount used, with a retarded reappearance of germs;
  wide applicability and environmental compatibility;
  much lower acetic acid content than in previously known disinfectants containing PAA and $H_2O_2$; this reduces odour problems during application; due to the absence of a disproportionately large amount of acetic acid, there is also no basis for a renewed and possibly explosive proliferation of the germs;
  the disinfectant is readily available and can be handled, stored and transported without problems; no material problems.

EXAMPLES

The tests were carried out on water from a sewage treatment plant (overflow water from the preliminary sedimentation of the sewage treatment plant), which had a germ count of $10^5$–$10^6$ CFU/ml (CFU=colony forming units).

250 ml of sample water were incubated in a Schott flask in the presence of the appropriate disinfectant at room temperature on a shaker. The disinfectants were prediluted in water and the dilution was used immediately. A batch without disinfectant was incubated simultaneously as a blank. Samples were taken at specific intervals of time and a dilution series was made up. The total cell count was determined by plating out each of the dilutions twice on standard I nutrient agar.

As the initial samples could not immediately be processed further (diluted and plated out) because they were taken in very quick succession, the remaining peroxide or the peracetic acid was destroyed. The $H_2O_2$ was rapidly decomposed by adding catalase and the peracetic acid was decomposed by adding a few drops of 0.1N sodium thiosulphate solution.

The following disinfectants were tested:

| No. | Disinfectant | PAA | $H_2O_2$ | Acetic acid |
|-----|--------------|-----|----------|-------------|
|     |              | Concentration (wt. %) | | |
| E 1 | peracetic acid solution 1 (according to the invention) | 2.0 | 50.0 | 0.4 |
| NE 1 | peracettic acid solution 2 (not according to the invention | 4.9 | 26.5 | 6.5 |
| NE 2 | hydrogen peroxide | — | 50.0 | — |

FIG. 1 shows the disinfecting action of the disinfectant according to the invention, "E1", in comparison with the disinfectants not according to the invention, "NE 1" and "NE 2", and with a blank sample, "B". The use concentrations of "E 1", "NE 1" and "NE 2" were 6 ppm PAA/150 ppm $H_2O_2$, 6 ppm PAA/32 ppm $H_2O_2$ and, respectively, 150 ppm $H_2O_2$ (ppm=parts per million). With "E 1" and "NE 1" a germ reduction of about 2 orders of magnitude, from about $10^6$ to $10^4$ CFU/ml, could be measured after an exposure time of 3 hours (h), about 90% of the microorganisms already being destroyed within 15 minutes. With "NE 2" the germ reduction was substantially slower and, after 3 h, five times more germs were detectable than with "E 1" and "NE 1".

Figure 2:
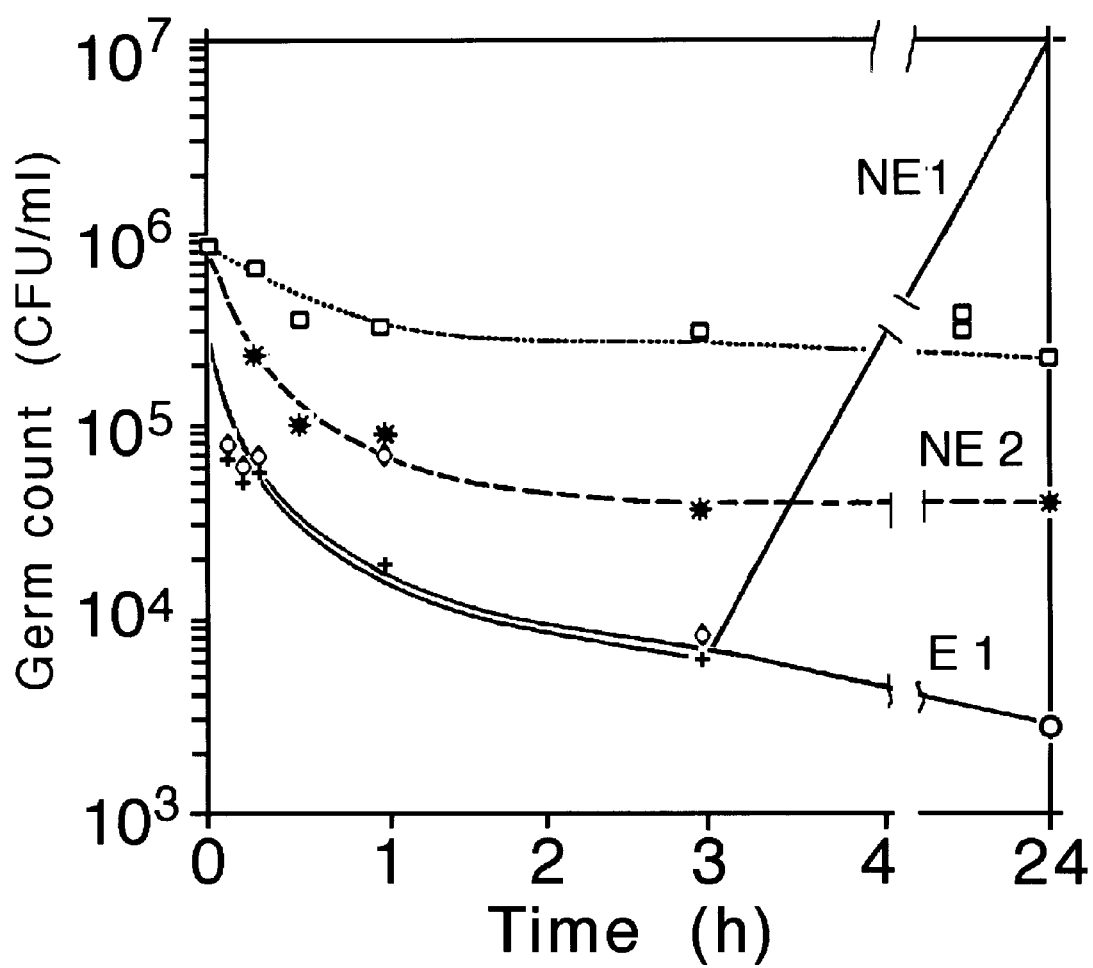

Comparison of the long-term action—cf. FIG. 2: After an incubation time of 24 h, the germ count in the batches with "NE 1" had increased again, whereas the disinfecting action of "E 1" persisted for 24 h and the germ count had even decreased a little further. This long-term action of "E 1" in comparison with "NE 1" is attributed to the markedly higher content of $H_2O_2$ (150 ppm $H_2O_2$ compared with 32 ppm) which had still not decomposed after 24 h. In the batch with $H_2O_2$ (=NE 2), the germs had also not proliferated again after 24 h, but had remained constant at the higher level of ca. $5 \cdot 10^4$ CFU/ml. After 48 h, however, the germ count had also increased again in the batches with "E 1" and "NE 2".

We claim:

1. Process for the disinfection of sewage works outputs and industrial recirculating waters and effluents, and retardation of the reappearance of germs therein, by the addition of a disinfectant, containing peracetic acid and hydrogen peroxide, in an amount of at least 1 mg of peracetic acid per litre of water, characterized in that the disinfectant contains 1.5 to 2.5 wt. % of peracetic acid, 40 to 60 wt. % of hydrogen peroxide and less than 2 wt. % of acetic acid.

2. Process according to claim 1, characterized in that the disinfectant contains less than 1 wt. % of acetic acid.

3. Process according to claim 1, characterized in that the disinfectant is added in an amount of 4 to 10 mg of peracetic acid per liter of water.

4. The process according to claim 2, wherein the disinfectant is added in an amount of 4 to 10 mg of peracetic acid per liter of water.

5. The process according to claim 1 wherein said disinfectant comprises 1.5 to 2.5 wt. % of peracetic acid, 40 to 50 wt % of hydrogen peroxide and less than 1 wt. % of acetic acid.

6. A process for the control of a microorganism which is a member selected from the group consisting of bacteria, viruses, fungi and algae comprising contacting an aqueous system containing at least one of said member, having an initial concentration expressed as germ count per ml of water, with a disinfectant comprising 1.5% to 2.5 wt. % of peracetic acid, 40 to 60 wt. % of hydrogen peroxide and less than 2 wt. % of acetic acid under such conditions that the destruction of said member expressed in germ count per ml of water is at least one order of magnitude below the initial concentration expressed as germ counter per ml of water after 24 hours following addition of the disinfectant.

7. The process according to claim 6 wherein the germ count of said aqueous system is reduced to a germ count by an amount as measured by colony forming units at least equivalent to a reduction in a germ count from $10^6$ CFU/ml to $10^5$ CFU/ml.

8. A process for the disinfection of effluent from the food, brewing or dairy industry comprising adding to said effluent a disinfectant comprising 1.5 to 2.5 wt. % peracetic acid, 40 to 60 wt. % of hydrogen peroxide and less than 2 wt. % acetic acid.

9. A process for the disinfection and removal of odor and slime from swimming pool water comprising adding to said swimming pool water a disinfectant comprising 1.5 to 2.5 wt. % peracetic acid, 40 to 60 wt. % of hydrogen peroxide and less than 2 wt. % acetic acid.

* * * * *